United States Patent
Fan et al.

(10) Patent No.: US 11,556,716 B2
(45) Date of Patent: Jan. 17, 2023

(54) INTENT PREDICTION BY MACHINE LEARNING WITH WORD AND SENTENCE FEATURES FOR ROUTING USER REQUESTS

(71) Applicant: INTUIT INC., Mountain View, CA (US)

(72) Inventors: Zhewen Fan, San Diego, CA (US); Kyle Brown, San Diego, CA (US); Sparsh Gupta, San Diego, CA (US)

(73) Assignee: INTUIT INC., Mountain View, CA (US)

( * ) Notice: Subject to any disclaimer, the term of this patent is extended or adjusted under 35 U.S.C. 154(b) by 246 days.

(21) Appl. No.: 17/000,398

(22) Filed: Aug. 24, 2020

(65) Prior Publication Data
US 2022/0058342 A1   Feb. 24, 2022

(51) Int. Cl.
| | | |
|---|---|---|
| *G06F 40/35* | (2020.01) | |
| *G06F 40/279* | (2020.01) | |
| *G06N 20/00* | (2019.01) | |
| *G06F 40/30* | (2020.01) | |
| *G06N 5/04* | (2006.01) | |
| *G06F 40/237* | (2020.01) | |

(52) U.S. Cl.
CPC ........... *G06F 40/30* (2020.01); *G06F 40/237* (2020.01); *G06N 5/04* (2013.01); *G06N 20/00* (2019.01)

(58) Field of Classification Search
CPC ... G10L 15/16; G10L 15/1822; G06F 40/279; G06F 40/284; G06F 40/30; G06F 40/35; G06N 20/00

USPC ....... 704/1, 9, 10; 706/12, 20; 707/708, 728, 707/771

See application file for complete search history.

(56) References Cited

U.S. PATENT DOCUMENTS

| | | | | |
|---|---|---|---|---|
| 10,764,431 | B1* | 9/2020 | Pham | G10L 15/26 |
| 11,023,682 | B2* | 6/2021 | Tagra | G06F 40/30 |
| 11,182,557 | B2* | 11/2021 | Mallinar | G06F 40/35 |
| 11,295,745 | B1* | 4/2022 | Roy | G10L 15/30 |
| 2014/0025706 | A1* | 1/2014 | Barve | G06F 40/30 |
| | | | | 707/771 |
| 2015/0127591 | A1* | 5/2015 | Gupta | G06N 20/00 |
| | | | | 706/12 |
| 2018/0012139 | A1* | 1/2018 | Schmid | G06N 20/00 |
| 2018/0075131 | A1* | 3/2018 | Van Hoof | G06F 40/35 |
| 2019/0103095 | A1* | 4/2019 | Singaraju | G06F 40/35 |
| 2019/0130905 | A1* | 5/2019 | Bilgory | G10L 15/22 |
| 2019/0362021 | A1* | 11/2019 | Balduino | G06F 40/289 |
| 2020/0050667 | A1* | 2/2020 | Lin | G06F 40/279 |
| 2020/0259891 | A1* | 8/2020 | Abraham | G06F 16/95 |
| 2020/0342873 | A1* | 10/2020 | Teserra | G06F 40/35 |
| 2021/0042372 | A1* | 2/2021 | Huang | G06N 20/00 |

(Continued)

*Primary Examiner* — Martin Lerner
(74) *Attorney, Agent, or Firm* — DLA Piper LLP (US)

(57) ABSTRACT

Systems and methods may be used to generate and use intent predictions to enhance user experience. The intent predictions may describe the data required to resolve a user request included in a user input (e.g., question, search query, and the like) submitted by a user. The intent predictions may be generated using a machine learning model that comprises a model framework for extracting features and classifying user inputs into intent classes based on the extracted features. The intent predictions may be integrated into an information service to improve business metrics including contact rate, transfer rate, helpful rate, and net total promoter score.

20 Claims, 6 Drawing Sheets

(56) References Cited

U.S. PATENT DOCUMENTS

| | | | |
|---|---|---|---|
| 2021/0103634 A1* | 4/2021 | Gkikas | G06F 40/284 |
| 2021/0174015 A1* | 6/2021 | Bhattacharya | G06F 40/30 |
| 2021/0327413 A1* | 10/2021 | Suwandy | G06F 40/242 |
| 2021/0357835 A1* | 11/2021 | Modi | G06F 40/30 |
| 2021/0383066 A1* | 12/2021 | Zhu | G06F 40/284 |
| 2021/0390656 A1* | 12/2021 | Krishnamoorthy | G06F 40/56 |
| 2021/0406913 A1* | 12/2021 | Yao | G06F 40/30 |

* cited by examiner

INTENT PREDICTION BY MACHINE LEARNING WITH WORD AND SENTENCE FEATURES FOR ROUTING USER REQUESTS

BACKGROUND

Software platforms may offer a wide variety of products and services to many different types of users. Despite careful design, some aspects of the products and services offered on a software platform may not be intuitive to some users. To provide a better experience for users and maximize the likelihood users will continue to use a particular software platform, it is desirable to efficiently address a wide variety of questions and other requests from users. Thus, it would be advantageous to predict the intent of each question (i.e., the information the user is attempting to elicit by submitting the question) or request (i.e., the information that will resolve the user's request) submitted by a user. Once known, the predicted intent could be leveraged to streamline various customer service and user experience work flows.

DETAILED DESCRIPTION OF SEVERAL EMBODIMENTS

Figure 1:
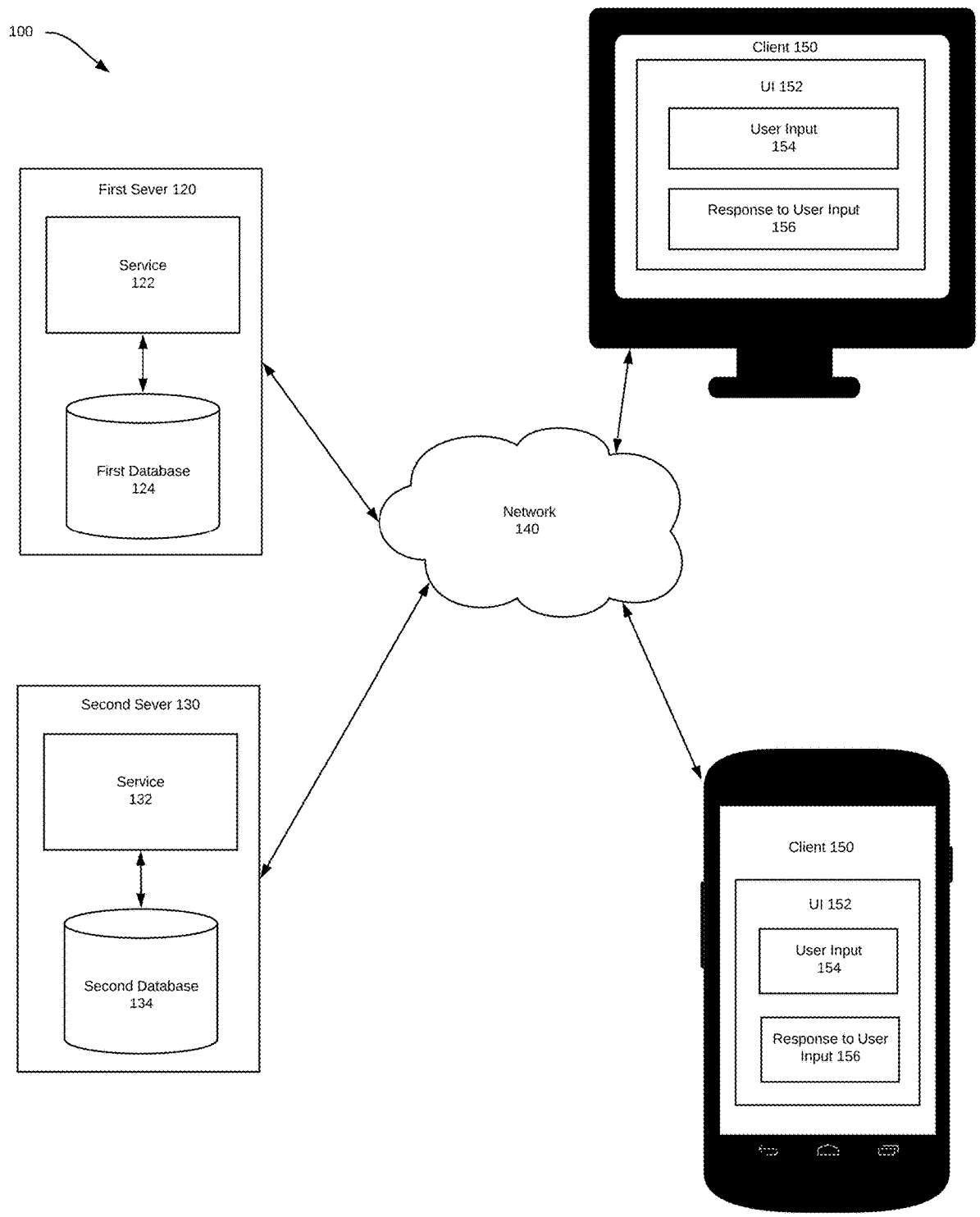
FIG. 1 shows an exemplary system configured to generate and use intent predictions in accordance with an embodiment of the present disclosure.

Embodiments described herein may generate intent predictions for questions, search queries, and other text data received from users of a software platform. The intent predictions may include one or more classifications describing information the user is attempting to elicit from the question and or search query. The intent predictions may be used to improve user experience. For example, the intent predictions may be used to generate personalized answers and or search results to deliver a unique, user specific user experience that makes the software platform easier to use and better suited to the needs of each user. Intent predictions may also be used to route user requests to a specialized queue in a customer service platform. For example, user requests having a predicted tax question intent may be routed to a call queue that connects users with CPAs or other tax professionals. User requests having a predicted product intent may be routed to a product customer service specialist. Routing user requests to the appropriate queue can resolve a wide variety of user requests more efficiently by reducing the number of call transfers. More intelligent routing can also resolve user requests in less time by reducing the handling time required to resolve each request.

Intent predictions may be generated by a machine learning system that extracts features from text data received from users and session data associated with each piece of text data. One or more machine learning models then receives the extracted features as input and compares the extracted features to one or more sets of features learned from training data. Based on the comparison, the machine learning models generate an intent prediction for each piece of received text data. The intent predictions may then be used to enhance user experience. The user experience improvement provided by the intent predictions may be measured by one or more business metrics, for example, contact rate, transfer rate, handling time, display rate, helpful rate, net promoter score (TPNS, i.e., the likelihood a user would recommend the product to someone else), cost per minute, and the like. Intent predictions generated using the approaches described herein improve several of these business metrics over previous techniques while also improving the accuracy of the intent predictions, and the computer processing efficiency of the operations required to generate the predictions. Accordingly, the techniques of the disclosure may be used to enhance user experience and improve the functioning of computer systems by reducing the amount of time, training data, memory resources, and processing resources required to generate intent predictions using machine learning techniques.

The intent prediction techniques of the disclosure are also rapidly scalable and customizable to handle a wide variety of different user requests. Hotfixes and other ad hoc logic may be implemented in concert with the one or more machine learning models to customize the intent prediction output to a particular business need. Hotfixes may be implemented to restrict and or modify the output of the intent prediction generation system according to type of user request. For example, hotfixes may automatically generate a particular intent prediction (i.e., a modified intent prediction) for input data having one or more keywords. Hotfixes may also require intent predictions to have a predetermined confidence level to ensure only intent predictions having a high likelihood of accuracy are returned as output by the machine learning system. The hotfixes may be adjusted in real time based on the input data (i.e., text and context) received from the user and the input predictions generated by the machine learning system.

FIG. 1 shows an example of a system 100 configured to implement a process for generating intent predictions for user input 154 (e.g., questions, keyword searches, and the like) in accordance with the disclosed principles. The intent predictions may include a classification or other output that describes a category, context, or other description of information the user is attempting to access via the user input 154 and or information required to resolve user requests, problems, and or issues included in the user input 154. For example, intent predictions may include a classification that identifies the user input 154 as including product related requests, tax related requests, tax advice requests, and the like. The system 100 may include a first server 120, second server 130, and or one or more client devices 150. First server 120, second server 130, and or client device(s) 150 may be configured to communicate with one another through network 140. For example, communication between the elements may be facilitated by one or more application programming interfaces (APIs). APIs of system 100 may be proprietary and/or may be examples available to those of ordinary skill in the art such as Amazon® Web Services (AWS) APIs or the like. Network 140 may be the Internet and/or other public or private networks or combinations thereof.

First server 120 may be configured to implement a first service 122, which in one embodiment may be used to generate features and or intent predictions from user input 154. The user input 154 captured in the user interface (UI) 152 of the one or more client devices 150 may be transferred to the first service 122 via the network 140 and stored in one or more databases 124, 134, the second server 130 and or client device(s) 150. The first server 120 may execute processes that extract one or more features (e.g., text features, context features, and the like) from the user input 154 and generate an intent prediction for each piece of user input 154 based on the one or more features. The first server 120 may extract one or more features and or generate the intent predictions using one or more machine learning models. The machine learning models may be stored in a first database 124, second database 134, and or received from second server 130 and or client device(s) 150.

First service 122 or second service 132 may implement an information service, which may include a variety of products for managing data and providing functionalities to streamline workflows related to people, businesses, and other entities. The information service may be any network 140 accessible service that maintains financial data, medical data, personal identification data, and or other data types. For example, the information service may include QuickBooks® and its variants by Intuit® of Mountain View Calif. The information service may provide one or more features that use the structured form representations and structured metadata generated by the system 100. The information service may consume intent predictions generated by the first server 120 to enhance a user experience for one or more of the products included in the information services. For example, the information service may generate personalized answers in response to user questions based on the predicted intent for each user question to provide a unique user experience. The information service may also use the intent predictions to route user requests to call queues handled by subject matter experts that specialize in the type of issues related to the predicted intent for each request to ensure users get better information about their specific issue in less time.

Client device(s) 150 may be any device configured to present user interfaces (UIs) 152 and receive user inputs 154. The UIs 152 may be configured to display a response 156 to each user input. The responses 156 may include, for example, personalized answers, call queue confirmation, contact information of an appropriate subject matter expert, or other outputs generated based on intent predictions generated by the first server. The UIs 152 may also capture session data including UI screen id, product id (e.g., product sku), input text/product language, geography, platform type (i.e., online vs. mobile), and other context features that may be used to generate intent predictions. Exemplary client devices 150 may include a smartphone, personal computer, tablet, laptop computer, or other device.

First server 120, second server 130, first database 124, second database 134, and client device(s) 150 are each depicted as single devices for ease of illustration, but those of ordinary skill in the art will appreciate that first server 120, second server 130, first database 124, second database 134, and or client device(s) 150 may be embodied in different forms for different implementations. For example, any or each of first server 120 and second server 130 may include a plurality of servers or one or more of the first database 124 and second database 134. Alternatively, the operations performed by any or each of first server 120 and second server 130 may be performed on fewer (e.g., one or two) servers. In another example, a plurality of client devices 150 may communicate with first server 120 and/or second server 130. A single user may have multiple client devices 150, and/or there may be multiple users each having their own client device(s) 150.

Figure 2:
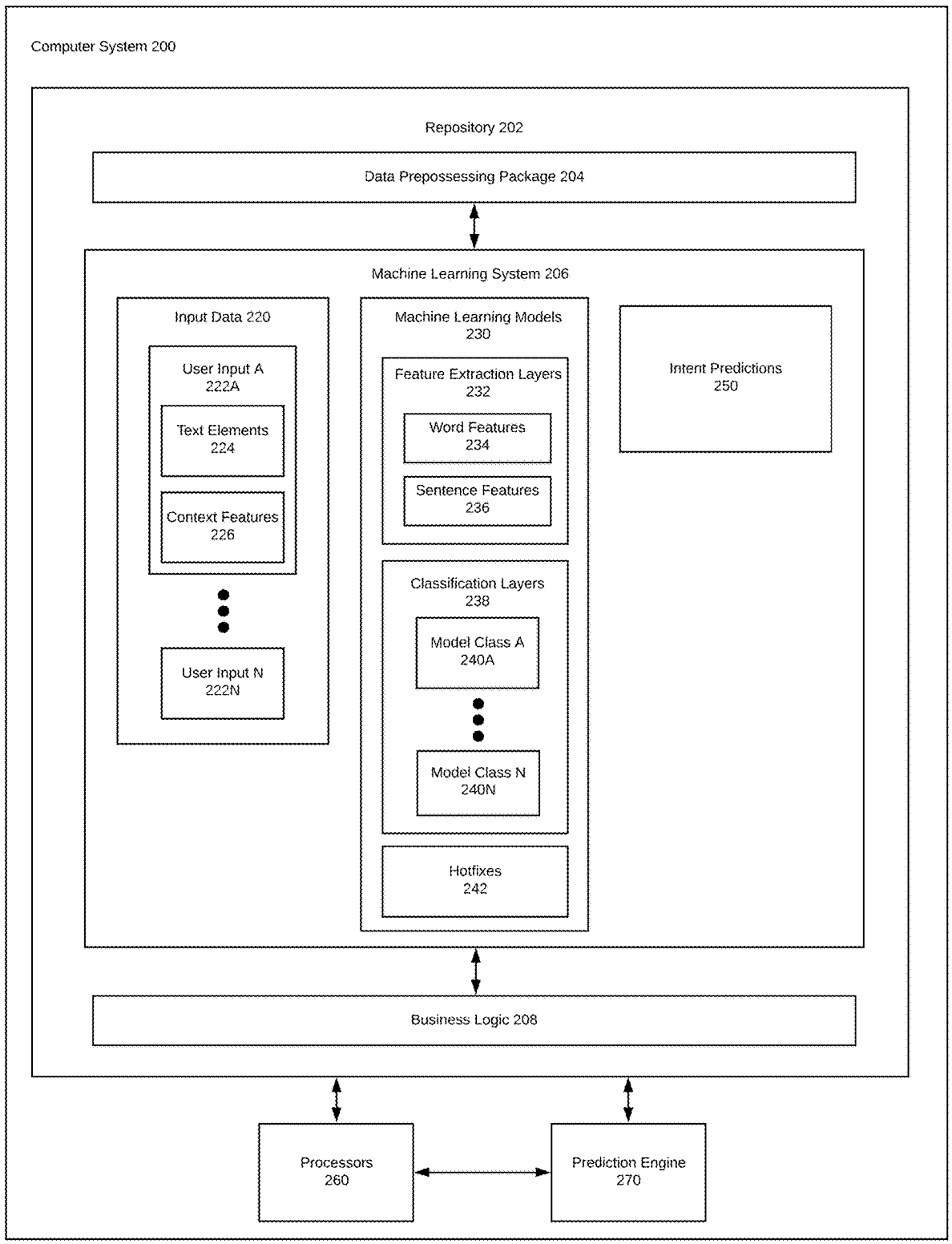
FIG. 2 shows more details of the system of FIG. 1 according to an embodiment of the present disclosure.

FIG. 2 is a block diagram illustrating an example computer system 200 in accordance with one or more embodiments of the invention. As shown in FIG. 2, the computer system 200 includes a repository 202, a prediction engine 270, and one or more computer processors 260. In one or more embodiments, the computer system 200 takes the form of the computing device 600 described in FIG. 6 and the accompanying description below or takes the form of the client device 150 described in FIG. 1. In one or more embodiments, the computer processor(s) 260 takes the form of the computer processor(s) 602 described in FIG. 6 and the accompanying description below.

In one or more embodiments, the repository 202 may be any type of storage unit and/or device (e.g., a file system, database, collection of tables, or any other storage mechanism) for storing data. Further, the repository 202 may include multiple different storage units and/or devices. The multiple different storage units and/or devices may or may not be of the same type or located at the same physical site. The repository 202 may include a data preprocessing package 204, a machine learning system 206, and business logic 208.

The data preprocessing package 204, manipulates user inputs to facilitate feature extraction and other processing steps performed by the machine learning system 206. The data preprocessing package 204 may receive one or more strings of text or other user input from a client device. The user input may be received as a HTML, XML, JSON or other structured data format that includes strings of text and other text data as well as session data. The session data may include context information that describes the product, language, geography, UI screen, and other context information related to the user input and or strings of text included in the user input. The data preprocessing package 204 may then parse the received input to tokenize each word and separate punctuation and other elements of the received text string. The data preprocessing package 204 may then clean the received text string may removing any HTML tags or other artifacts of the markup language format used to transfer the text string. Cleaning the received text sting, prevents superfluous tags and other markup language artifacts that persist in the received text string from being input into the machine learning models 230. These extraneous tokens can add unnecessary parameters to the machine learning models 230 and reduce the performance and or accuracy of the machine learning models 230.

The data preprocessing package 204 may then standardize the tokenized text string by replacing symbols and other non-alpha numeric tokens (e.g., currency symbols, links and other url tokens, percent symbols, and the like) with a standard token. For example, the data preprocessing package 204 may replace currency tokens with <curr>, percent tokens with <perc>, and url tokens with <link>. The data preprocessing package 204 may also replace acronyms such as state names, country names, and the like in the text string with their full forms to ensure strings including the acronym are treated the same as strings including the full form text. The data preprocessing package 204 may also convert capitalized proper noun tokens, words in all caps, tokens including the first word in a sentence, and all other capitalized tokens to lower case text. Standardizing capitalization ensures the machine learning model 230 with recognize capitalized and uncapitalized forms of the words as having the same meaning. The data preprocessing package 204 then replaces periods, commas, question marks, and other punctuations included in the text string with blank white spaces to ensure tokens including the same word with and without a punctuation mark are treated the same by the machine learning model 230. Each of the text standardization operations ensures the output string generated by the data preprocessing package 204 retains all of the useful information included in the received text string without adding unnecessary parameters to the machine learning models 230 that can reduce the model's performance and or accuracy.

The data preprocessing package 204 may also modify one or more tokens included in the received text string to improve the quality of data input into the machine learning models 230. For example, the data preprocessing package 204 may execute one or more spell check modules to correct the spelling of the words included in the received text string. Additionally, domain specific terms may be identified and standardized by the data preprocessing package 204. For example, tokens included in the received text string may be checked against a database of domain specific terms including, for example, tax form names, tax form field names, government institution names, and other common key words found in previously submitted user input text (e.g., "turbotax", "covid", and the like). The data preprocessing package 204 may identify instances of these terms and convert them to a standardized format. For example, the data preprocessing package 204 may convert all instances of form name "1099 int" (i.e., the US federal form for reporting interest income) including "1099INT", "1099-Int", and the like to "1099int". Correcting spelling and standardizing domain specific terms enables output strings generated by the data preprocessing package 204 to capture all of the text information that may be relevant to the string's intent regardless of user error and the use of uncommon, specialized terms.

The data preprocessing package 204 may also manipulate session data to facilitate the extraction of context features 226. The data preprocessing package 204 may tokenize, clean, standardize, and or modify screen id, user id, product id, geography, language, platform type, and other elements captured in the session data for the user session generating the received text string. For example, the data preprocessing package 204 may clean string values extracted from session data by removing prefixes or tags that persist due to parsing session data formatted in HTML, XML, JSON, or other markup languages. The data preprocessing package 204 may also input missing, null, or not a number (NAN) values. The data preprocessing package 204 may also execute hotfixes or other ad hoc logic to encode strings and other text as context features 226 that include vectors or other numerical representations. The data preprocessing package 204 may manipulate the context features post generation to facilitate processing by the machine learning system 206. For example, if the matrix including generated context features 226 is too sparse, the data preprocessing package 204 may select only the top "k" screens (i.e., screens that appear most frequently) and treat all other screen id values as null. The data preprocessing package 204 may output context features in an array, list, or other data structure that can be input into the machine learning models 230.

Received text strings and other user inputs manipulated by the data preprocessing package 204 may then be provided to the machine learning system 206 as input data 220. The input data 220 may include a plurality of user inputs 222A, . . . , 222N, for example questions, search queries and other inputs that have been processed by the data preprocessing package 204. Each of the user inputs 222A, . . . , 222N include a plurality of text elements 224 and or context features 226. The text elements 224 may include words, symbols, specialized terms and other tokens generated by the data preprocessing package 204. The context features 226 may include screen id, user id, product id, geography, language, platform type, and other context elements included in session data that describe the product and or service in use by the user generating the user input.

The machine learning system 206 includes one or more machine learning models 230 that receive input data 220 as input and generate intent predictions 250 as output. The machine learning models 230 be implemented as classifiers using XGBoost. Alternatively, the machine learning models may be implemented as k-nearest neighbor (k-NN) classifiers. The machine learning models may be implemented as various types of deep learning classifiers, such as a neural network classifier (based on convolutional neural networks (CNNs)), random forest classifier, SGD classifier, lasso classifier, gradient boosting classifier, bagging classifier, adaptive boosting classifier, ridge classifier, elastic net classifier, or NuSVR classifier. Deep learning, also known as deep structured learning or hierarchical learning, is part of a broader family of machine learning methods based on learning data representations, as opposed to task-specific algorithms. Exemplary implementations are discussed in more detail below.

As shown in FIG. 2, the machine learning models 230 may include a plurality of layers. The plurality of layers may include one or more feature extraction layers 232 (e.g., word feature extraction layers, sentence feature extraction layers, and the like) that generate quantitative representations of text data included in the user inputs 222A, . . . , 222N. The feature extraction layers 232 may generate word features 234, for example, vectors, embeddings, or other representations of words included in user inputs 222A, . . . , 222N. The feature extraction layers 232 may generate word features 234 including vector representations of words determined using one or more statistical formulas, heuristics, or other algorithms. For example, word features 234 may include vector representations that reflect the importance of a particular term within a particular corpus or library of terms determined using term frequency-inverse document frequency (TF-IDF) algorithms.

To more efficiently represent words (i.e., reduce the dimensions of the vector space needed to represent a sentence or collection of words) and more accurately capture the meaning and or context of each word, word embeddings (e.g., Word2vec embeddings) may be used to generate word features 234. The word embedding word features 234 may include a learned representation of text that reflects the meaning of a word as the word is used within the user input. One or more word embedding word features 234 may be generated for each word included in the user input. The feature extraction layers 232 for generating the word embedding word features 234 may be pre-trained on a large corpus of documents or other text data. The corpus may be specialized to a particular context (e.g., a tax corpus, financial data management corpus, a medical corpus, an income tax filing corpus). The feature extraction layers 232 for word embeddings may be pre-trained on a large corpus of many different document types, then fine-tuned on a more specific specialized corpus that is related to the context of the user inputs analyzed by the machine learning models 230. For example, the feature extraction layers 232 may be pretrained on a large corpus of hundreds, thousands, or even millions of documents related to a wide variety of subject matters. The feature extraction layers 232 may then be tuned using a specialized corpus including documents related to a particular subject matter (e.g., tax information). Relative to the large corpus, the specialized corpus may have a smaller number of total documents but greater number of documents related to the particular subject matter (e.g., tax information). Context features 226, for example, may be used to select a particular specialized corpus to train and or fine tune pre-trained word embeddings. Word features 234 including word embeddings may encode the context and other relationships between words found in the training corpus. For example, generic relationships including male-female relationships between terms like king and queen, verb-tense relationships, country-capital relationships may be captured in the word embeddings. Specific word relationships distilled from a specialized corpus, for example, tax corpus, including form (e.g., 1099) field description (e.g., salary, wages, and tips) may also be captured in word embeddings.

Word2vec embeddings generate word features 234 that represent the words included in a sentence more in 300 dimension vectors relative to 1000 dimension vectors required to represent a sentence using TF-IDF. Word2vec embeddings can also be pre-trained and can handle previously unseen words that have similar meanings or a relationship with a word in the training corpus. Therefore, Word2vec approaches reduce the training time required to generated word features relative to TF-IDF which must be re-trained from scratch each time a set of word features 234 is generated. Additionally, Word2vec word embeddings capture information from more terms relative to TF-IDF methods which only encode terms that are included in the training corpus.

The feature extraction layers 232 may also process word features 234 to generate sentence features 236 or other sentence level representations of user inputs 222A, . . . , 222N. The feature extraction layers 232 generating the sentence features 236 may be implemented as any neural network (NN) or other model layers that extract meaningful information about the structure, arrangement, context, and or other features of the individual word features of a sentence included in the user inputs 222A, . . . , 222N. For example, the feature extraction layers 232 may aggregate, average, or determine other statistical measurements for the word embeddings to generate sentence features 236. The feature extraction layers 232 may also include long term short term memory (LSTM) layers, convolution layers, and other NN layers that may output sentence features that include a meaningful sentence representation.

The machine learning models 230 may include one or more classification layers 238. The classification layers 238 may include a plurality of model classes 240A, . . . , 240N that represent different intent predictions. For example, the classification layers 238 may include 69 different model classes 240A, . . . , 240N with each class corresponding to a particular type of information required to resolve a particular user request expressed in a particular user input. The model classes 240A, . . . , 240N may also correspond to different agents and or queues handling user inputs having a particular intent. The classification layers 238 may receive the word features 234, sentence features 236, and or context features 226 as input and generate an intent classification as output. To generate the intent classification, the classification layers 238 may compare the received features (e.g., the word features, sentence features, and or context features) to features derived from the training data. The features derived from the training data may include a plurality of sets of features including a set of features for each class of intent prediction included in the training dataset. Hotfixes 242 and other ad hoc logic may be applied to the intent classifications to generate the intent predictions 250. The intent classifications generated by the classification layers 238 are not required to be modified by hotfixes 242 therefore may also be output as intent predictions 250.

Exemplary hotfixes 242 may include keyword based hotfixes that override the intent classifications output by the classification layers 238 to generate a specific intent prediction (i.e., a modified intent prediction) for user inputs 222A, . . . , 222N that include particular keywords. For example, user inputs 222A, . . . , 222N including "cpa", "expert", "k-1", "irs", and other tax advice keywords may be given a tax advice intent prediction regardless of the intent classifications for the user inputs 222A, . . . , 222N generated by the machine learning models 230. Hotfixes 242 may also be threshold based. Threshold based hotfixes 242 may require intent classifications generated by the classification layers 238 to meet a particular confidence score threshold before it can be given as an intent prediction for the user inputs 222A, . . . , 222N. The classification layers 238 may generate a confidence score associated with each of the model classes 240A, . . . , 240N included in the intent classifications. If the model class 240A having the highest confidence score does not meet that confidence score threshold of the hotfix implementation, the intent prediction 250 for the user input 222A will be a default "None" value instead of the model class 240A generated by the classification layers 238. The threshold based hotfix 242 ensures only intent classifications having a high confidence level or other indicator of a high likelihood of accuracy will be returned as intent predictions 250.

Intent predictions 250 generated by the machine learning system 206 may be consumed by business logic 208 to enhance user experiences. Business logic 208 may be implemented in, for example, an information service included in a software application. The business logic 208 may interface with the machine learning system 206 to, for example, receive intent predictions and or performance data and other information required to determine metrics used to evaluate the machine learning system 206. One or more APIs may facilitate the flow of data between the machine learning system 206 and business logic 208.

Business logic 208 may receive intent predictions 250 and, in response, generate personalized answers that are provided to a user interface of a client device. The business logic 208 may also consume intent predictions 250 and route user requests included in user inputs 222A, . . . , 222N to a handling agent and or call queue to efficiently connect the user with a subject matter expert who can resolve the user's issue quickly. The business logic 208 may also determine one or more metrics to evaluate the performance of the machine learning system and the amount of improvement to user experienced generated by the intent predictions 250.

The prediction engine 270 may include functionality to operate the machine learning system to generate one or more predictions, for example, intent predictions 250. The prediction engine 270 may also include functionality to replace and or update input data 220, machine learning models 230, the machine learning system 206, business logic 208, and or the data preprocessing package 204 stored in the repository 202. The computer processors 260 may include functionality to execute the prediction engine 270. The prediction engine 270 may be implemented in hardware (e.g., circuitry), software, firmware, and/or any combination thereof.

Figure 3:
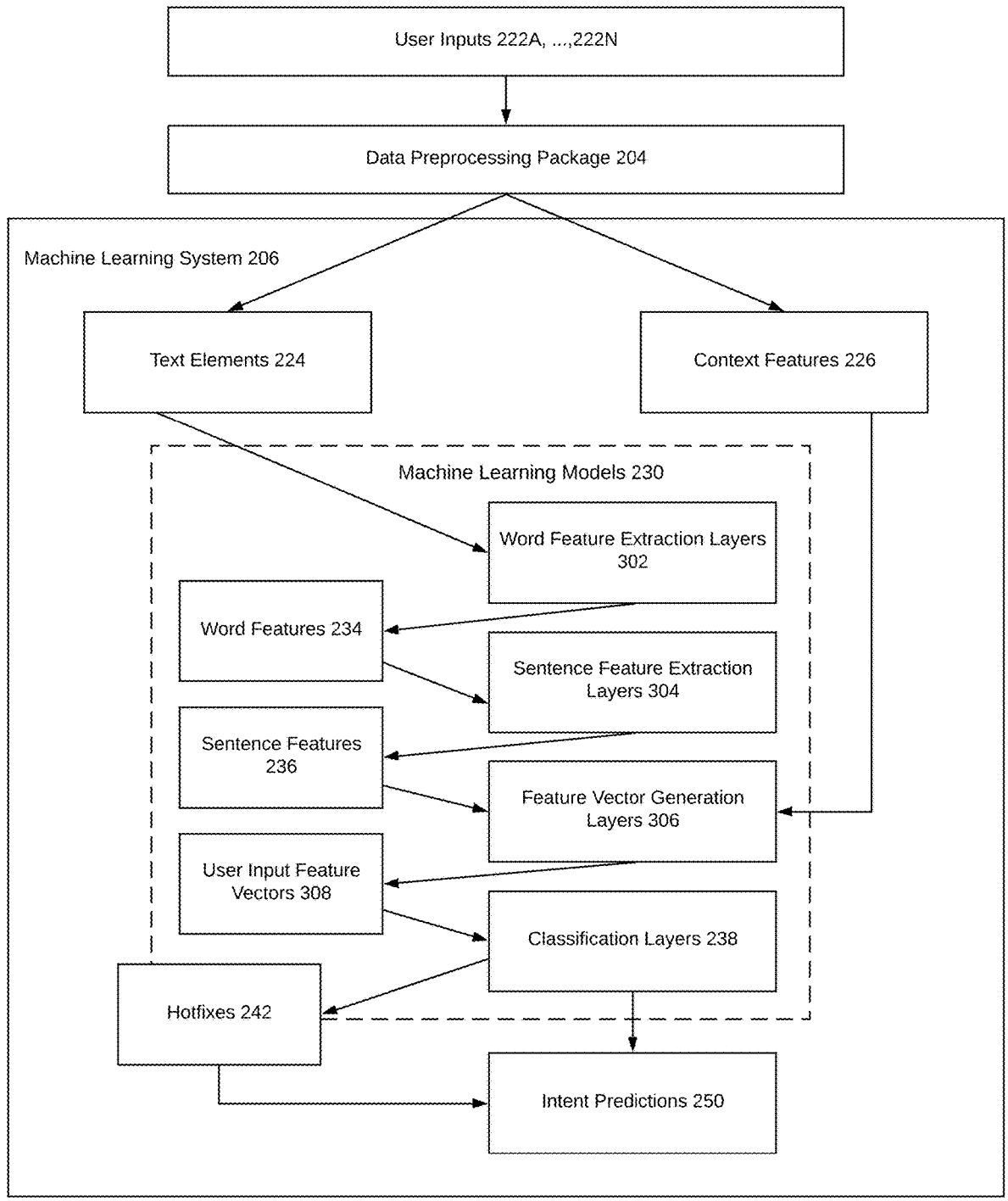
FIG. 3 shows more details of the machine learning system of FIG. 2 according to an embodiment of the present disclosure.

FIG. 3 illustrates more details of the machine learning system 206. As shown, user inputs 222A, . . . , 222N are received by the data preprocessing package 204. The user inputs 222A, . . . , 222N may include questions, search queries and other text strings submitted by users as well as session data including the product and or UI screen used to submit the user inputs 222A, . . . , 222N and other context elements. As described above, the data preprocessing package 204 cleans, standardizes, and or modifies the user inputs to extract text elements 224 (i.e., words and other tokens) and context features 226 (i.e., UI screen id, product id (e.g., product sku), input text/product language, geography, platform type (i.e., online vs. mobile) for the user inputs 222A, . . . , 222N.

The text elements 224 and the context features 226 output by the data preprocessing package 204 are received by the machine learning system 206. The text elements may be fed into one or more word feature extraction layers 302 to generate word features 234. The word features 234 generated by the word feature extraction layers 302 may include statistical measurements, word embeddings, vectors and other numerical representations of the words included in the user inputs 222A, . . . , 222N. As described above, the word feature extraction layers 302 may generate word features 234 using one or more statistical formulas, heuristics, algorithms, or feature generation techniques, for example, TF-IDF, Word2vec embeddings, and the like. For example, the word feature extraction layers 302 may include one or more pre-trained Word2vec embedding layers that generate word embeddings for each of the text elements 224. The Word2vec word feature extraction layers 302 may be pre-trained on a large corpus of hundreds, thousands, or even millions of documents related to a wide variety of subject matters. The Word2vec word feature extraction layers 302 may then be tuned using a specialized corpus including documents related to a particular subject matter (e.g., tax information). Relative to the large corpus, the specialized corpus may have a smaller number of total documents, but a greater number of documents related to the particular subject matter (e.g., tax information).

Word features 234 are fed into the sentence feature extraction layers 304 to generate statistical measurements, vectors, and other numerical representations of sentences and other groups of words included in the user inputs 222A, . . . , 222N. The sentence feature extraction layers 304 may include NN layers and or any other model layers that extract meaningful information from the word features 234 to generate sentence features 236 including a learned representation of the user input. For example, the sentence feature extraction layers 304 may include a max pooling layer that determines the maximum word embedding value for each individual word included in the user inputs 222A, . . . , 222N and outputs a sentence embedding or other sentence feature 236 that includes the maximum word embedding value for each word in the sentence.

The context features 226, word features 234, and or sentence features 236 may be fed into one or more feature vector generation layers 306. The feature vector generation layers 306 may concatenate the sentence features 236, word features 234, and or context features 226 to form a feature vector that combines all and or a portion of the extracted features for each user input into a user input feature vector 308. Concatenating the context features 226 with the sentence features 236 generates a user input feature vector 308 that encodes all of the meaningful information in the text string and session data for each of the user inputs 222A, . . . , 222N into a singular vector representation that may be efficiently processed by the classification layers 238.

The model framework shown in FIG. 3 having a plurality of distinct word feature extraction layers 302, sentence feature extraction layers 304, and feature vector generation layers 306 ensures more of the meaningful information included in each user input 222A will be captured in the user input feature vector 308 fed into the classification layers 238. This model framework Includes more feature extraction layers than previous TF-IDF vectorization approaches to ensure more meaningful data about the content, meaning, context, and arrangement of the words and sentences included in each user input is used to generate intent predictions. Adopting the model framework shown in FIG. 3 improves the accuracy and performance of the machine learning system relative to machine learning systems using TF-IDF vectorization feature extraction approaches. In particular, the feature extraction approach used in the model framework shown in FIG. 3 increased the confidence level of input predictions to reduce the instances where the intent prediction was "None", reduced the number of misclassified user inputs 222A, . . . , 222N and improved question routing by distributing the intent predictions across the plurality of model classes more evenly.

To generate intent predictions, the user input feature vectors 308 are fed into one or more classification layers 238. The classification layers 238 may include one or more fully connected layers, linear layers, or other NN layers that output the intent classifications for each user input feature vector 308. The number of fully connected layers, linear layers, and other NN layers, may be a hyperparameter that may be tuned to control the learning process during model development. To generate the intent predictions, the classification layers 238 may map the user input feature vector 308 for each user input 222A to an input classification. To perform the mapping, the classification layers 238 may learn relationships between different words and context features and input classes. These relationships may be represented as features of input classes distilled from training data. The training data may include user inputs 222A, . . . , 222N labeled with the correct intent classification/prediction. Additionally, weights may be applied to each input class based on the number of user inputs classified in each class. For example, input classes may be weighted using equation 1 below.

$$\text{weight}[i] = \frac{\text{\#total samples}}{\text{\#classes} \times \text{\#samples in class } i} \qquad 1)$$

Values for each input class may be determined by the classification layers 238 for each user input feature vector 308 based on the comparison between the model features of each class derived from the training data and the class weights. Implementations of the classification layers 238 may be incorporated into supervised and unsupervised machine learning models 230. For example, the classification layers 238 may be implemented as part of a binary and or multiclass logistic regression model. The classification layers 238 may also be implemented as part of feed forward neural networks, memory networks, convolutional neural networks, and or question and answer ranking networks. Memory networks may use content of personalized answers generated for each intent classification to improve predictions. The personal answers are stored in memory and function as an attention mechanism that allows the network to focus more on words in the user input having a strong relationship to words in the personalized answers. The question and answer ranking approach uses one or more convolution layers to extract features from input text elements at an n-gram level to understand the context of the words included in the user input 222A. Fully connected layers then use the extracted features to output a match score. The score may match an input to an intent class and or an intent class to personalized answers that are displayed to users in response to questions, search queries, or other inputs having a particular intent prediction.

Intent classifications output by the classification layers 238 may be modified by one or more hotfixes 242 or other ad hoc logic. The hotfixes 242 may, for example, generate a particular intent prediction based on one or more keywords included in the user input 222A. Hotfixes 242 may also prevent class predictions having a low confidence score or other indicator of a high likelihood of inaccuracy from being returned as intent predictions 250. Intent classifications output by the classification layers 238 may also be provided to business logic as intent predictions 250 without modification.

Intent predictions 250 generated by the machine learning models 230 may be used to improve user experience. Intent predictions 250 may be used to inform a routing system for distributing user requests to handling agents and call queues. For example, the information service may include a "contact us" and or "help" screen for submitting user questions and other user input. The intent predictions 250 may be used to route different types of user requests to handling agents and call queues specialized to resolve the user requests associated with a category of problems (e.g., product issues, tax advice questions, technical issues, tax form questions, and the like). To more efficiently resolve user problems, the routing system may send user inputs having a particular intent prediction 250 to handling agents and call queues associated with the particular intent class that matches the intent prediction 250. For example, user inputs given a tax advice intent prediction by the machine learning models 230 may be routed to certified public accounts (CPAs) and other tax professionals designated to handle a request classified as tax advice.

The model framework shown in FIG. 3 includes multiple feature extraction layers and classification layers 238 that may be included in a neural network implementation of machine learning models. The approach to feature extraction and classification provided by this model framework improves the accuracy and precision of the intent prediction relative to previous model frameworks incorporating TF-IDF vectorization feature extraction techniques and logistic regression based classification. Table 1 below includes the prediction accuracy observed for 5 different implementations of the model framework described herein. The "Rna US" model generates intent predictions used to provide personalized answers to United States based user queries. The "Rna Canada" model generates intent predictions used to provide personalized answers to Canada based user queries. The "Routing US" model generates intent predictions used to route US based user requests to handling agents. The "Routing Canada" model generates intent predictions used to route Canada based user requests to handling agents. The "TAM" model generates intent predictions used to determine if user requests include a tax advice question.

TABLE 1

| Model | Total Data Size | Test Data Size | V1 (Prev. Framework) Accuracy | V2 (New Framework) Accuracy |
|---|---|---|---|---|
| Rna US | 40 k | 4 k | 85.32% | 91% |
| Rna Canada | 1.5 k | 200 | N/A | 96.4% |
| Routing US | 200 k | 20 k | 80.2% | 83.67% |
| Routing Canada | 100 k | 10 k | 70.8% | 74% |
| TAM* | 20 k | 2 k | 85.89% | 83.39% |

The V2 model framework described herein significantly increased the prediction accuracy for 4 of the 5 model implementations described above relative to previous model frameworks incorporating TF-IDF vectorization feature extraction techniques and logistic regression based classification (i.e., the V1 Previous Framework). As described above, the V2 "Rna US" model predicted the correct intent from 68 possible intent classes with an accuracy of 91%. For this model implementation, the accuracy of the V2 model framework increased 5.7% relative to the V1 previous framework. The "Rna US" model was trained on a training dataset of 40 thousand data samples and the 91% accuracy score was generated using a test dataset of 4 thousand data samples. The "Rna Canada" model predicted the correct intent from 3 possible intent classes with an accuracy of 96.4% The "Rna Canada" model was trained on a training data set of 1.5 thousand data samples and the 96.4% accuracy score was generated using a test dataset of 200 data samples. The V2 "Routing US" model predicted the correct intent from 69 possible intent classes with an accuracy of 83.67%. For this model implementation, the accuracy of the V2 model framework increased 3.47% relative to the V1 previous framework. The "Routing US" model was trained on a training dataset of 200 thousand data samples and the 83.67% accuracy score was generated using a test dataset of 20 thousand data samples. The V2 "Routing Canada" model predicted the correct intent from 35 possible intent classes with an accuracy of 74%. For this model implementation, the accuracy of the V2 model framework increased 3.2% relative to the V1 previous framework. The "Routing Canada" model was trained on a training dataset of 100 thousand data samples and the 74% accuracy score was generated using a test dataset of 10 thousand data samples.

The V2 "TAM" model predicted the correct intent from 2 possible intent classes with an accuracy of 83.39%. For this model implementation, the accuracy of the V2 model framework decreased 2.5% relative to the V1 previous framework. However, the F1 score of the V2 "TAM" model increased from 61.6% to 63.8%. F1 score is a combination of accuracy (i.e., percentage of correct predictions out of total predictions) and recall (i.e., percentage of total predictions that are correct). Therefore, although the accuracy of the V2 implementation fell, the V2 "TAM" model performance is superior to the V1 implementation because the number of false positives and false negatives for the V2 implementation significantly decreased relative to the V1 implementation. The "TAM" model was trained on a training dataset of 20 thousand data samples and the 83.39% accuracy score was generated using a test dataset of 2 thousand data samples.

The performance statistics presented in Table 1 demonstrate a significant increase in performance of each model implementation. The accuracy of the intent predictions 250 generated by the V2 model framework described herein increased for 4 out of the 5 model implementations relative to the V1 framework. The total F1 score increased for the lone implementation (i.e., the TAM model) that did not produce an increase in accuracy for V2 relative to V1. The increased performance of several different model implementations that incorporated the model framework described herein indicates the V2 model framework is widely applicable across many different model types and product implementations.

The improvement in the accuracy of the intent predictions 250 generated by the machine learning models 230 produced an improvement in user experience. User experience may be quantified using one or more business metrics. Incorporating the intent predictions generated by the model framework described in FIG. 3 into workflows of the information service increased several business metrics indicative of user experience. For example, the display rate of personalized answers was increased by 7 percentage points when using the model framework described herein to generate the intent predictions relative to the previous model framework. The contact rate of agents and the helpful rate of answers and agents when responding to user requests were increased by 1.5 percentage points and 3.5 percentage points respectively when using the more accurate intent predictions 250.

The machine learning models 230 also had improved performance and efficiency relative to the previous model frameworks. The annual hosting costs, average latency, average response time, all decreased for the machine learning models 230 described herein relative to previous model frameworks. Table 2 below summarizes the performance and accuracy improvements.

TABLE 2

| Model Version | Ave. Latency | Ave. Resp. Time | Ave. Annual Holding $ | Model Test Accuracy | Transfer Rate |
| --- | --- | --- | --- | --- | --- |
| V1 (Previous Framework) | 31 ms | 122 ms | $19,508 ($4,877) | 86% | 3.51% |
| V2 (New Framework) | 29 ms | 107 ms | $1,646 | 92% | 3.32% |

The previous model framework used in version 1 of the model (V1) included TF-IDF vectorization feature extraction techniques and a logistic regression intent classification model. The new model framework of the disclosure (V2) includes the word feature extraction layers 302 that generate word features using Word2vec embeddings, the sentence feature extraction layers 304, and the feature vector generation layers 306 described above. Additionally, the V2 model framework implements a neural network approach to intent classification. As shown in table 2 the V2 model framework described herein requires fewer memory resources to host resulting in an approximately three fold decrease in server cost. The 4 model implementations generated using the V1 framework were deployed as a single endpoint. Therefore, to calculate server costs, the total handling costs was divided by 4 to estimate the average handling cost for each model implementation. The decrease in handling costs for V2 model implementations may be attributed to an updated deployment architecture that deploys each model as a distinct endpoint. The updated deployment architecture enables each model to be deployed for its own performance requirements which can change over time as a result of more and or less traffic and different product implementation requirements.

The V2 model framework is also faster and more efficient as shown by the 2 millisecond (ms) improvement in average latency and the 15 ms improvement in response time relative to V1. The V1 model framework also improved average intent prediction accuracy by 6%. The improved intent prediction accuracy resulted in a 5.4% decrease in transfer rate which lowered the average handling time for customer requests. The reduction in average handling time improves customer experience by resolving customer issues in less time and also reduces the operating costs of the product service, tax service, tax advice service, and other customer service products included in the information service. The lower transfer rate resulted in $0.60 reduction in cost per contact which yielded a savings in operating costs of $1.45 million.

While FIGS. 2-3 show a configuration of components, other configurations may be used without departing from the scope of the disclosed principles. For example, various components may be combined to create a single component. As another example, the functionality performed by a single component may be performed by two or more components.

Figure 4:
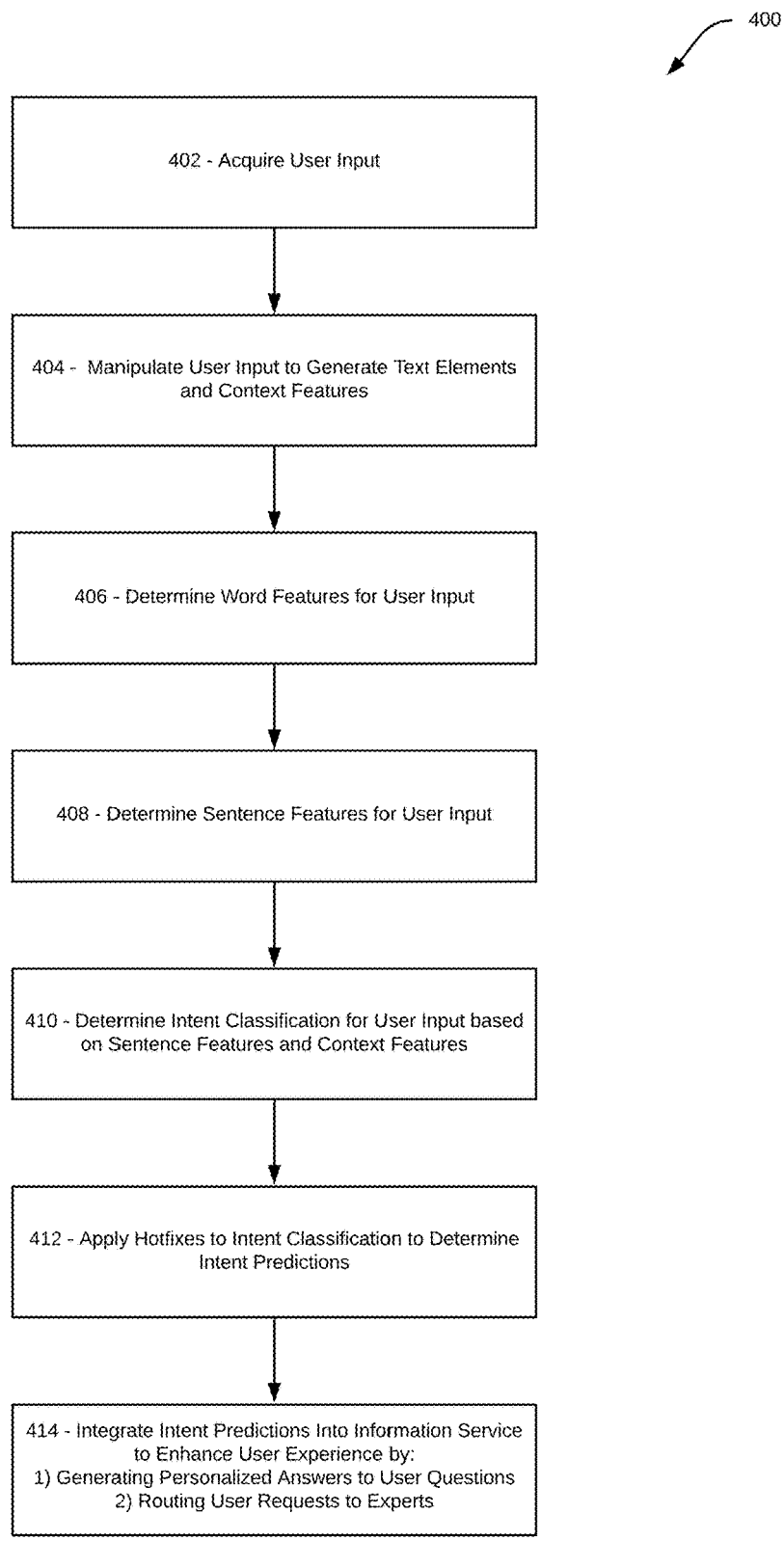
FIG. 4 is a flow diagram illustrating an exemplary method for generating intent predictions according to an embodiment of the present disclosure.

FIG. 4 is a flow chart illustrating an exemplary process 400 for generating and using intent predictions. The process 400 may be implemented using the computer system 200 shown in FIGS. 2-3. At step 402, user input is acquired from a user device. User input may include a text component (e.g., a question, search query, or other input text submitted by a user) and session data. Session data may include one or more context elements that describe the user interface screen, product, language, geography, platform type and other elements describing the product the user is working in and activities with the product that resulted in the user submitting a question, problem, search query or other request in the user input. At step 404, the user input is received by the data preprocessing package. The data preprocessing package manipulates the user input to extract words, numerical values, symbols, and other text elements from one or more text strings included in the user input. The data preprocessing package also extracts context elements from the session data. The data preprocessing package may then clean, standardize, and or modify the extracted text elements and or context elements to generate text elements and context features that may be received by the machine learning system as input data.

At step 406, text elements from the input data are fed into the word feature extraction layers of the machine learning models to determine word features. The world features may include, for example, word embeddings, vectors, or other numerical representations of text data. At step 408, the word features are input into the sentence feature extraction layers of the machine learning model to generate sentence features. The sentence features may be generated by aggregating word features for each word included in a sentence in the user input. The sentence features may also be generated by determining one or more statistical measurements for the word features and or using one or more neural network layers or other unsupervised learning approaches to extract meaningful data about the content, meaning, context, arrangement, or properties of words included in each sentence of the user input.

At step 410, the word features, sentence features, and or context features may be input into or more classification layers. The word features, sentence features, and or context features for each user input may be combined into one feature vector that is input into the classification layers. The classification layers may be implemented in an unsupervised or supervised machine learning model. For example, the classification layers may include layers of a neural network (e.g., LSTM layers, convolution layers, and the like). The classification layers may classify the user input into one or more model classes that describe the intent of the user input. The model classes may correspond to the type of information the user is seeking to elicit by submitting the user input and or the type of information required to resolve a request included in user input. For example, user inputs including questions about accounting products of the information service may be giving an accounting product intent. In another example, user inputs including tax advice questions may be given a tax advice intent. In total, the machine learning model may include 69 or more unique model classes with each class corresponding to a different intent.

At step 412, one or more hotfixes are applied to the intent classifications generated by the classification layers to determine an intent prediction for each user input. The hotfixes may modify the intent classifications based on, for example, the inclusion of one or more keywords in the user input and or a confidence score or other criteria. The hotfixes may be dynamically applied to rapidly address new situations and user intents that may arise due to, for example, specific changes in the products included in the information service and or new and or updated tax rules or other rules that impact the products or services offered in the information service. The hotfixes may also be used to adjust the intent predictions to rapidly adapt to changes in a particular geography, industry, customer base, business environment, and or economic conditions (e.g., pandemics, economic recessions, changes in tax law, disruptive technologies and or business models, and the like). Intent classification generated by the classification layers may also be provided as intent predictions without modification by one or more hotfixes. Hotfixes may also be associated with particular intent classifications and or confidence scores so that hotfixes may be automatically applied to all intent classifications included in a particular model class or having a particular range of confidence scores.

At step 414, the intent predictions may be integrated into the information service to enhance customer experience. The intent predictions may be leveraged in one or more workflows included in the information service including response to search queries and routing customer service request. For example, the intent predictions may be used to generate personalized answers to user questions. The intent predictions may also be used to distribute questions and other user inputs to handling agents and or call queues to connect users with subject matter experts that can resolve each user's request faster and more efficiently. Leveraging the intent predictions, provides a tangible benefit to customers by reducing the transfer rate and improving the display rate, contact rate and net promoter score (TNPS).

Figure 5:
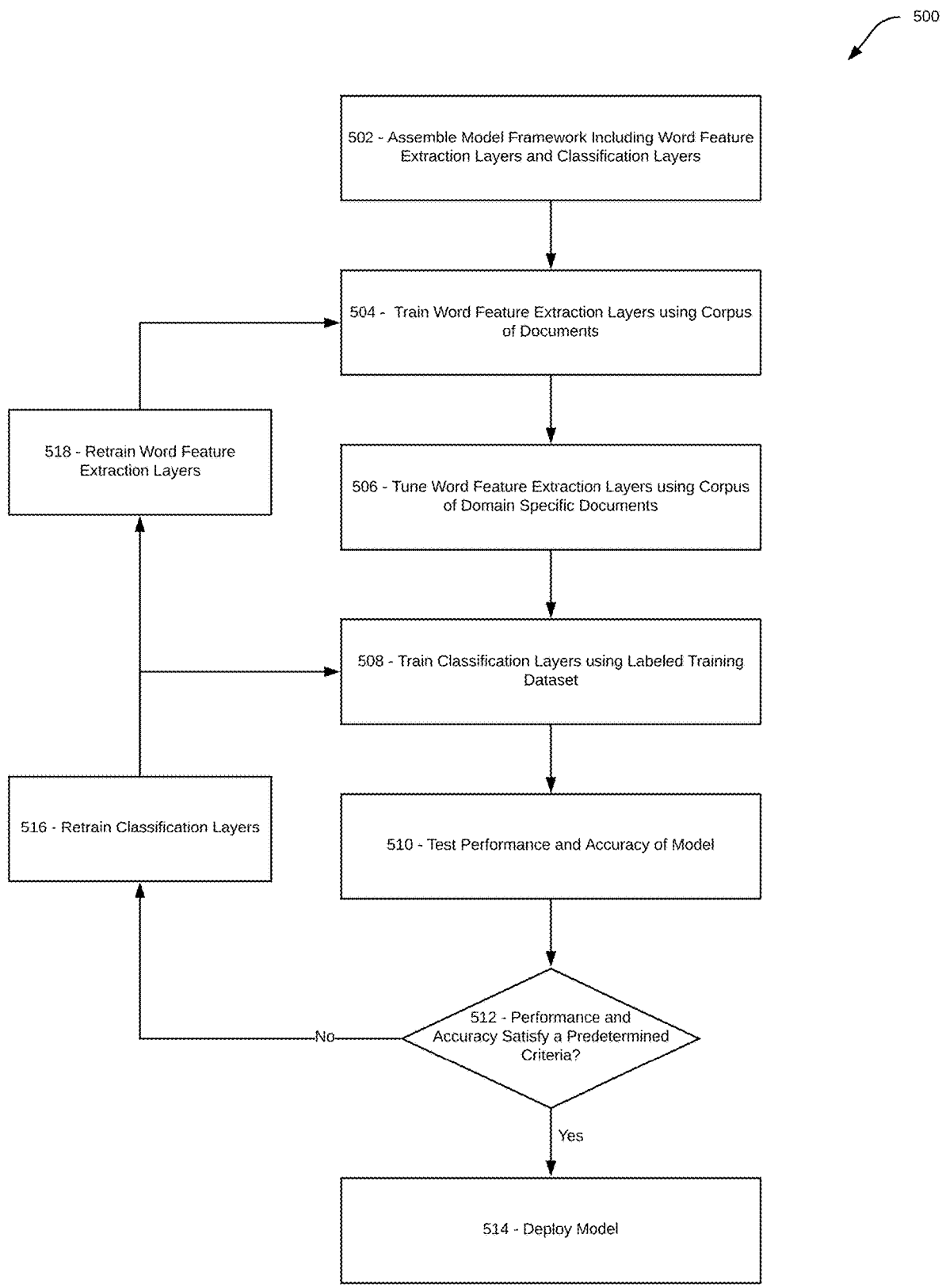
FIG. 5 is a flow diagram illustrating an exemplary method for training a model framework to generate intent predictions according to an embodiment of the present disclosure.

FIG. 5 is a flow diagram illustrating an exemplary process 500 for training the machine learning models described herein. The process 500 may be implemented using the computer system 200 shown in FIGS. 2-3. At step 502, a machine learning model framework including word feature extraction layers and classification layers is assembled. The machine learning model framework assembled at step 502 may also include one or more sentence feature extraction layers and one of more feature vector generation layers. The machine learning model framework may be implemented in one or more supervised and or unsupervised machine learning models.

At step 504, the word feature extraction layers may be trained using a corpus of documents. The word feature extraction layers may include one or more Word2vec layers that encode text elements generated by the data preprocessing package into word embeddings or other vector representations. The corpus of documents used to train the word feature extraction layers may be a large corpus containing hundreds, thousands, or even millions of documents related to a wide variety of topics. At step 506, the word feature extraction layers may be tuned by training one or more additional word feature extraction layers on a corpus of domain specific documents. For example, for models handling user inputs related to tax products and advice, additional Word2vec layers may be trained using a corpus including tax forms, tax returns, tax laws, accounting guidelines, general accounting practices, and other documents having tax information. The corpus used to train the word feature extraction layers may also include user input previously received by the information system.

At step 508, the classification layers may be trained using a labeled training dataset that includes user inputs and their correct intent classifications/predictions. For example, the training dataset may include a plurality of previously received user inputs and correct intent prediction for each previously received user input included in the training dataset. The previously received user inputs included in the training dataset may be selected from user inputs entered by users of the information service that include requests that have been resolved and or have not been resolved. The classification layers may learn a set of features included in user inputs that are indicative of a particular intent class. These features may include individual words included in the user inputs, context features captured in session data associated with the input, sentence features including the arrangement, composition, context, and meaning of words and or groups of words in a sentence, and the like. The classification layers may be implemented in a classifier or other machine learning model. For example, the classification layers may be implemented in XGBoost classifiers, k-nearest neighbor (k-NN) classifiers, and or various types of deep learning classifiers. The deep learning classifiers implementing the classification layers may include neural network classifiers (e.g., classifiers based on convolutional neural networks (CNNs)), random forest classifiers, SGD classifiers, lasso classifiers, gradient boosting classifiers, bagging classifiers, ada boost classifiers, ridge classifiers, elastic net classifiers, and or NuSVR classifiers). The classification layers may also be implemented in one or more feed forward neural networks, memory networks, convolutional neural networks, and or question and answer ranking networks.

At step 510, the performance and accuracy of the model may be tested to evaluate the training process in steps 504-508. If at step 512 the model's performance and accuracy satisfy a predetermined criterion, the model may be deployed at step 514. For example, the model may be deployed if the annual hosting costs are under $10,000, the response time is under 150 ms, accuracy of the intent classifications generated for a test set of user inputs is above 90%, recall of the intent classifications for the test set is above 90%, and or some other predetermined performance and or accuracy criteria is satisfied. If at step 512 one or more predetermined performance and or accuracy criteria is not satisfied, the model may be retrained by retraining the classification layers at step 516 and or retraining the word feature extraction layers at step 518.

To retrain the model, one or more hyperparameters such as learning rate, batch size, model topology, size of the neural network, number of word feature extraction layers, number of pooling layers, number of classification layers, and the like may be changed and the model may be retrained. The model may also be retrained using the same and or different hyperparameters and different training data. For example, a larger, smaller, and or different corpus and or a larger, smaller, and or different training set of labeled user inputs.

Figure 6:
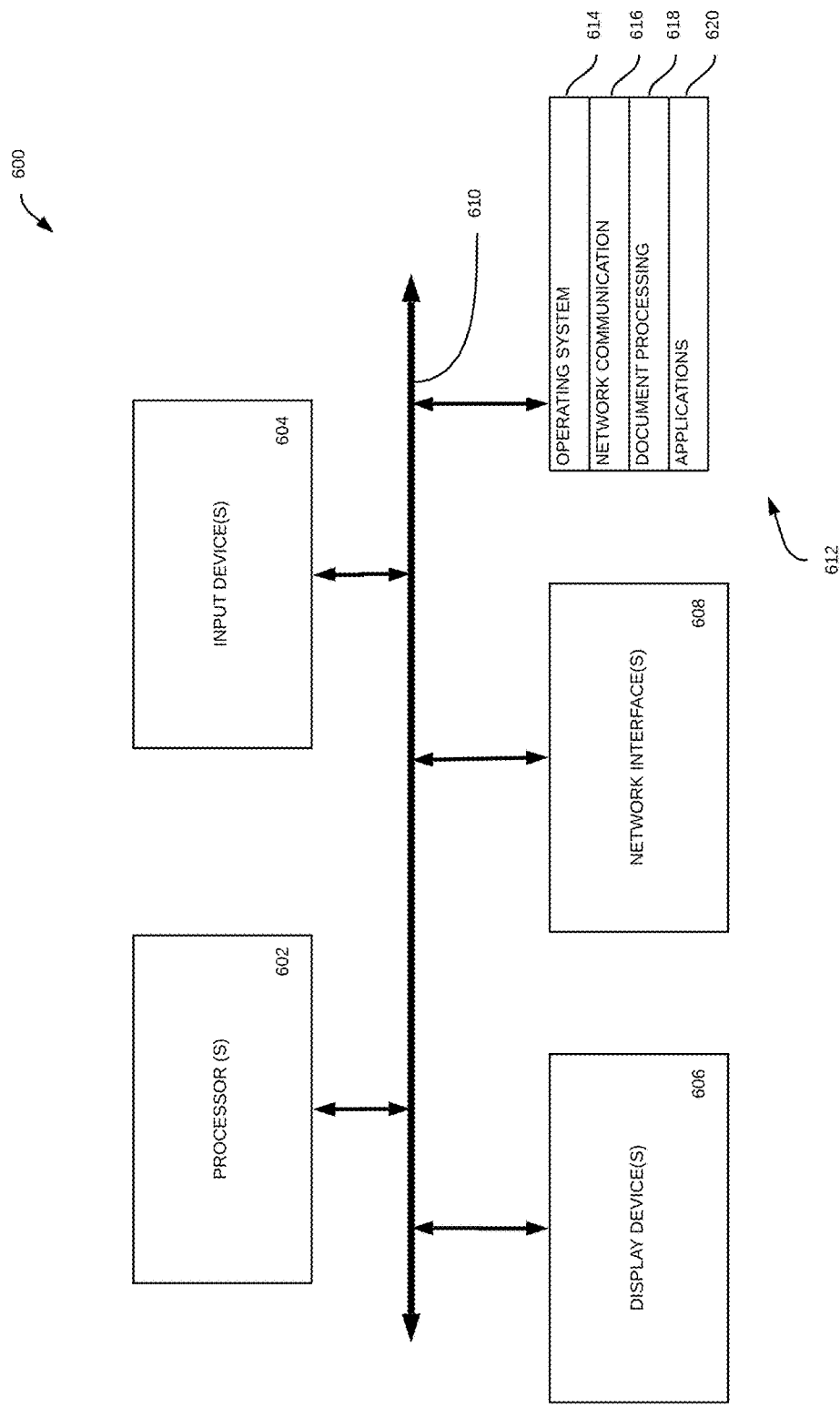
FIG. 6 is a block diagram illustrating a computing device according to an embodiment of the present disclosure.

FIG. 6 is a block diagram of an exemplary computing device 600 that may implement various features and processes as described herein. For example, computing device 600 may function as first server 120, second server 130, computer system 200, or a portion or combination thereof in some embodiments. The computing device 600 may be implemented on any electronic device that runs software applications derived from compiled instructions, including without limitation personal computers, servers, smart phones, media players, electronic tablets, game consoles, email devices, etc. In some implementations, the computing device 600 may include one or more processors 602, one or more input devices 604, one or more display devices 606, one or more network interfaces 608, and one or more computer-readable media 612. Each of these components may be coupled by a bus 610.

Display device 606 may be any known display technology, including but not limited to display devices using Liquid Crystal Display (LCD) or Light Emitting Diode (LED) technology. Processor(s) 602 may use any known processor technology, including but not limited to graphics processors and multi-core processors. Input device 604 may be any known input device technology, including but not limited to a keyboard (including a virtual keyboard), mouse, track ball, and touch-sensitive pad or display. Bus 610 may be any known internal or external bus technology, including but not limited to ISA, EISA, PCI, PCI Express, USB, Serial ATA or FireWire. Computer-readable medium 612 may be any non-transitory computer readable medium that participates in providing instructions to processor(s) 602 for execution, including without limitation, non-volatile storage media (e.g., optical disks, magnetic disks, flash drives, etc.), or volatile media (e.g., SDRAM, ROM, etc.).

Computer-readable medium 612 may include various instructions 614 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 604; sending output to display device 606; keeping track of files and directories on computer-readable medium 612; controlling peripheral devices (e.g., disk drives, printers, etc.) which can be controlled directly or through an I/O controller; and managing traffic on bus 610. Network communications instructions 616 may establish and maintain network connections (e.g., software for implementing communication protocols, such as TCP/IP, HTTP, Ethernet, telephony, etc.).

Document processing instructions 618 may include instructions that implement the disclosed process for generating and using structured metadata and structured form representations as described herein.

Application(s) 620 may be an application that uses or implements the processes described herein and/or other processes. The processes may also be implemented in the operating system.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment. In one embodiment, this may include Python.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

As can be appreciated, the principles disclosed herein can acquire and manipulate text data and session data having any format. The machine learning based approaches to generating intent predictions described herein are also more flexible and efficient than rules based techniques. The machine learning models may be scaled to classify user inputs collected from a wide variety of products and services without requiring document specific rules. The machine learning models therefore require fewer storage resources to maintain and less processing load to execute relative to product specific rules based approaches. Accordingly, the machine learning approaches described herein can generate intent predictions for a wide variety of user inputs more accurately with fewer computational resources relative to rules based prediction methods.

Another benefit of the disclosed principles is that they generate labeled training data that may be used to improve the accuracy of the machine learning models used to generate the intent predictions. These are major improvements in the technological art as they improve the functioning of the computer and are an improvement to the technology and technical fields of text data processing, natural language processing, feature engineering, information transfer, information routing, information generation, customer experience, and customer service.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A computer implemented method for predicting intent of text data, the method comprising:
    acquiring a user input including a string of text data describing a user request and session data describing a context of the string of text data;
    manipulating, by a preprocessing package, the string of text data to generate a plurality of text elements;
    manipulating, by the preprocessing package, the session data to generate context features;
    determining word features based on providing the plurality of text elements to a first set of feature extraction layers included in a machine learning model;
    determining sentence features based on providing the word features to a second set of feature extraction layers included in the machine learning model;
    determining an intent prediction for the user input based on providing the context features and the sentence features to a set of classification layers included in the machine learning model, wherein the intent prediction describes information for facilitating a resolution of the user request;
    applying a hotfix to the intent prediction responsive to determining that the intent prediction has a confidence score below a threshold, wherein the hotfix modifies the intent prediction determined by the set of classification layers to generate a modified intent prediction; and
    routing the user request based on the modified intent prediction.

2. The computer implemented method of claim 1, further comprising integrating the modified intent prediction into an information service to perform at least one of:
    generating personalized answers to one or more questions included in the text data; and
    routing the user request to a handling agent trained to resolve received user inputs including requests having an intent prediction that matches the modified intent prediction of the user input.

3. The computer implemented method of claim 1, the modified intent prediction is integrated into an information service.

4. The computer implemented method of claim 1, wherein each of the word features includes a learned representation of text that reflects a meaning of a particular word as the particular word is used within the user input.

5. The computer implemented method of claim 1, further comprising:
    training the first set of feature extraction layers using a large corpus of documents; and
    tuning the first set of feature extraction layers using a specialized corpus of documents related to a particular subject matter, wherein the specialized corpus of documents is smaller than the large corpus of documents and the specialized corpus of documents has a greater number of documents related to the particular subject matter relative to the large corpus of documents.

6. The computer implemented method of claim 1, wherein the intent prediction generated by the set of classification layers classifies the user input into a class selected from a plurality of classes, wherein each class corresponds to a particular type of information required to resolve the user request expressed in the user input.

7. The computer implemented method of claim 1, further comprising training the set of classification layers using a training dataset including a plurality of previously received user inputs and correct intent predictions for the plurality of previously received user inputs.

8. The computer implemented method of claim 7, wherein the set of classification layers determine the intent prediction for the user input by comparing a plurality of sets of features to the word features and context features determined for the user input, wherein the plurality of sets of features includes a set of features for each class of intent prediction included in the training dataset.

9. The computer implemented method of claim 1, further comprising generating, by one or more feature vector generation layers, a user input feature vector that combines the sentence features with the context features to provide a learned representation of the user input that is received by the set of classification layers.

10. The computer implemented method of claim 1, wherein integrating the intent prediction into an information service reduces a transfer rate for handling user requests.

11. A system comprising:
a memory coupled to a computer processor;
a repository configured to store:
  a user input including a string of text data describing a user request and session data describing a context of the string of text data;
  a preprocessing package; and
  a machine learning model including a first set of feature extraction layers, a second set of features extraction layers, and a set of classification layers; and
a prediction engine executing on the computer processor and using the memory, configured to:
  manipulate, using the preprocessing package, the string of text data to generate a plurality of text elements;
  manipulate, using the preprocessing package, the session data to generate context features;
  determine word features based on providing the plurality of text elements to the first set of feature extraction layers;
  determine sentence features based on providing the word features to the second set of feature extraction layers;
  determine an intent prediction for the user input based on providing the context features and the sentence features to the set of classification layers, wherein the intent prediction describes information for facilitating a resolution of the user request;
  apply a hotfix to the intent prediction responsive to determining that the intent prediction has a confidence score below a threshold, wherein the hotfix modifies the intent prediction determined by the set of classification layers to generate a modified intent prediction; and
  route the user request based on the modified intent prediction.

12. The system of claim 11, wherein the prediction engine is further configured to:
  integrate the modified intent prediction into an information service to generate personalized answers to one or more questions included in the text data; or
  route the user request to a handling agent trained to resolve received user inputs including requests having an intent prediction that matches the modified intent prediction of the user input.

13. The system of claim 11, wherein the modified intent prediction is integrated into an information service.

14. The system of claim 11, wherein each of the word features includes a learned representation of text that reflects a meaning of a particular word as the particular word is used within the user input.

15. The system of claim 11, wherein the prediction engine is further configured to:
  train the first set of feature extraction layers using a large corpus of documents; and
  tune the first set feature extraction layers using a specialized corpus of documents related to a particular subject matter, wherein the specialized corpus of documents is smaller than the large corpus of documents and the specialized corpus of documents has a greater number of documents related to the particular subject matter relative to the large corpus of documents.

16. The system of claim 11, wherein the intent prediction generated by the set of classification layers classifies the user input into a class selected from a plurality of classes, wherein each class corresponds to a particular type of information required to resolve the user request expressed in the user input.

17. The system of claim 11, wherein the prediction engine is further configured to:
  train the set of classification layers using a training dataset including a plurality of previously received user inputs and correct intent predictions for the plurality of previously received user inputs.

18. The system of claim 17, wherein the set of classification layers determine the intent prediction for the user input by comparing a plurality of sets of features to the word features and context features determined for the user input, wherein the plurality of sets of features includes a set of features for each class of intent prediction included in the training dataset.

19. The system of claim 11, wherein the machine learning model includes one or more feature vector generation layers; and the prediction engine is further configured to:
  determine, using the feature vector generation layers, a user input feature vector that combines the sentence features with the context features to provide a learned representation of the user input that is received by the plurality set of classification layers.

20. The system of claim 11, wherein the system reduces a transfer rate for handling user requests by integrating the intent prediction into an information service.

* * * * *